United States Patent [19]

Petersen

[11] 4,381,905
[45] May 3, 1983

[54] HYDRAULIC TORQUE AMPLIFIER, PARTICULARLY FOR STEERING DEVICES

[75] Inventor: Hans C. Petersen, Nordborg, Denmark

[73] Assignee: Danfoss A/S, Nordborg, Denmark

[21] Appl. No.: 178,919

[22] Filed: Aug. 18, 1980

[30] Foreign Application Priority Data

Aug. 28, 1979 [DE] Fed. Rep. of Germany ....... 2934618

[51] Int. Cl.³ ............................ F04B 9/10; F15B 9/10; F04C 2/10
[52] U.S. Cl. ................................ 418/61 B; 91/375 R; 180/149
[58] Field of Search .................... 418/61 B; 91/375 R, 91/375 A; 180/149

[56] References Cited

U.S. PATENT DOCUMENTS

| Re. 25,291 | 12/1962 | Charlson | 418/61 B |
| 3,131,602 | 5/1964 | Ford | 91/375 R |
| 3,801,239 | 4/1974 | Larson | 418/61 B |
| 4,169,515 | 10/1979 | Presley | 91/375 A |

FOREIGN PATENT DOCUMENTS

637550 12/1978 U.S.S.R. ............... 418/61 B

Primary Examiner—John J. Vrablik
Attorney, Agent, or Firm—Wayne B. Easton

[57] ABSTRACT

The invention relates to a hydraulic torque amplifier for steering devices or the like. The amplifier has a planetary type piston motor having a rotatable externally toothed inner gear and an orbitable, nonrotatable internally toothed outer gear. The amplifier has input and output shafts rotatably journaled in the amplifier housing in coaxial and axially spaced relation. The valving arrangement includes inner and outer sleeves with the input shaft being fixedly connected to the inner sleeve and the output shaft being fixedly connected to both the inner gear and the outer sleeve.

3 Claims, 12 Drawing Figures

HYDRAULIC TORQUE AMPLIFIER, PARTICULARLY FOR STEERING DEVICES

The invention relates to a hydraulic torque amplifier, particularly for steering devices, comprising a planetary piston motor having an externally toothed gear connected to an output shaft and, in mesh therewith, an internally toothed gear ring secured against rotation, and a rotary slide valve arrangement which forms a control valve by means of an inner and an outer sleeve and a distributor valve for the planetary piston motor by means of the outer sleeve and a housing bore, wherein the inner sleeve is coaxially connected to an input shaft for rotation therewith and the outer sleeve is connected to the output shaft for rotation therewith by way of entrainment means forming a feedback apparatus, a neutral position spring holding the control valve closed in the absence of an input torque.

In a known hydraulic torque amplifier of this kind (Danfoss Torque Amplifier Type S-101-F), the gear ring is fixed with respect to the housing and the gear turns and orbits. It is connected by way of a first cardan shaft to the output shaft and by way of a second cardan shaft to an entrainment pin which is securely inserted in the outer sleeve and engages with play through a recess in the inner sleeve. When the inner sleeve has been turned through a predetermined angle by means of the input shaft, the control valve opens depending on the direction and the planetary piston motor starts to run. In this case the outer sleeves forms a follow-up element which closes the control valve again when the output shaft has turned through the angle of the input shaft.

By using the two cardan shafts, unavoidable play is produced at the four articulation heads. Consequently, the covering faces of the slide valve in the closing position must be selected to be so large that closure will be ensured even when taking the play into account. This results in a certain amount of delay and inaccuracy on commencement of steering. In the case of small torque amplifiers, in which the control orifices for the control valve are distributed over the periphery of the inner and outer sleeve, there is often insufficient space for accommodating such large covering faces. For this reason, such torque amplifiers have hitherto been permitted only for vehicles of very low speed but not for normal motor vehicles.

It is also known (U.S. Pat. No. 3,905,727, DE-PS No. 15 28 998) to arrange the gear of a planetary piston motor on a shaft which can turn in bearings fixed with respect to the housing, whereas the gear ring is mounted in the housing for movement on an orbital path. This can, for example, be effected in that the gear ring comprises circular recesses which are completely filled with guide cylinders eccentrically mounted in the side portions. Another possibility is to provide semi-circular recesses at the edge of the gear ring, rollers of smaller diameter and mounted fixed with respect to the housing engaging in these recesses.

The invention is based on the problem of providing a hydraulic torque amplifier of the aforementioned kind in which the play necessitated by constructional reasons is reduced to a minimum and which can therefore also be used for the steering devices of normal motor vehicles.

This problem is solved according to the invention in that the output shaft carries the gear and the entrainment means and that the gear ring is mounted in the housing for movement on an orbital path.

In this construction, the feedback between the output shaft and the outer sleeve is practically free from play. The gear can also be fixed on the output shaft. Since this construction dispenses with all articulated connections and the play associated therewith, the closed condition of the control valve can be accurately defined with comparatively small covering faces. Consequently, it is also possible to produce torque amplifiers in which the inner and outer sleeve have comparatively small diameters. The direct connection between the outer sleeve and the output shaft also leads to a very safe transmission of force during emergency control operation. Not least, omission of the cardan shafts reduces the number of required components and gives considerable axial shortening.

In one embodiment, the entrainment means are formed by an entrainment pin passing radially through the output shaft. The latter can be pressed into the output shaft. This results in a construction which is particularly free from play if it is also pressed into the outer sleeve.

It is favourable if the entrainment pin is disposed closely adjacent to the gear. The output shaft can therefore be comparatively short.

It is advisable to mount the output shaft at both sides of the gear, it being supported by one of the sleeves by way of a bearing member. In this way there will be no operating disadvantages even if the output shaft is subjected to transverse forces.

This can for example be achieved in that the output shaft is supported on the inside of the inner sleeve by a bearing member.

In a preferred embodiment, the entrainment means comprise a ring element which serves as bearing member, is fixed on the output shaft to turn therewith, extends radially up to the region of the outer sleeve and is there connected to this sleeve to rotate therewith. In this case the ring element is at the same time utilised as a bearing member and as part of the entrainment means. Since the bearing forces need not be transmitted by way of the inner sleeve, the operation is particularly free from jamming.

In this case the ring element can be mounted at the inside of the outer sleeve and be connected thereto by at least one key. Compared with the other possibility of mounting the ring element directly in the housing bore, one here achieves a shorter axial constructional length.

The invention will now be described in more detail with reference to preferred examples illustrated in the drawing, wherein.

Referring to FIGS. 1 and 5 to 9, a housing 1 has an end wall 2, an intermediate plate 3, a spacer ring 4, a further intermediate plate 5 and a valve block 6, these being held together by tightening screws 7. The housing 1 can be mounted at a fixed position with the aid of screws engaging in tapped holes 8. An input shaft 9 is mounted in the valve block 6 and an output shaft 10 in the end wall 2. A planetary piston motor comprises an externally toothed gear 12 which is seated on the output shaft 10 and rotatable therewith and an internally toothed gear ring 13 which has one tooth more than the gear 12, is in mesh therewith and, together therewith, defines compression chambers 14. The gear ring comprises circular recesses 15 through which the tightening screws 7 engage, cylindrical guide sections 16 of these tightening screws preventing rotation of the gear ring 13 by abutting the peripheral faces of the recesses 15 but permitting orbital motion.

Figure 1:
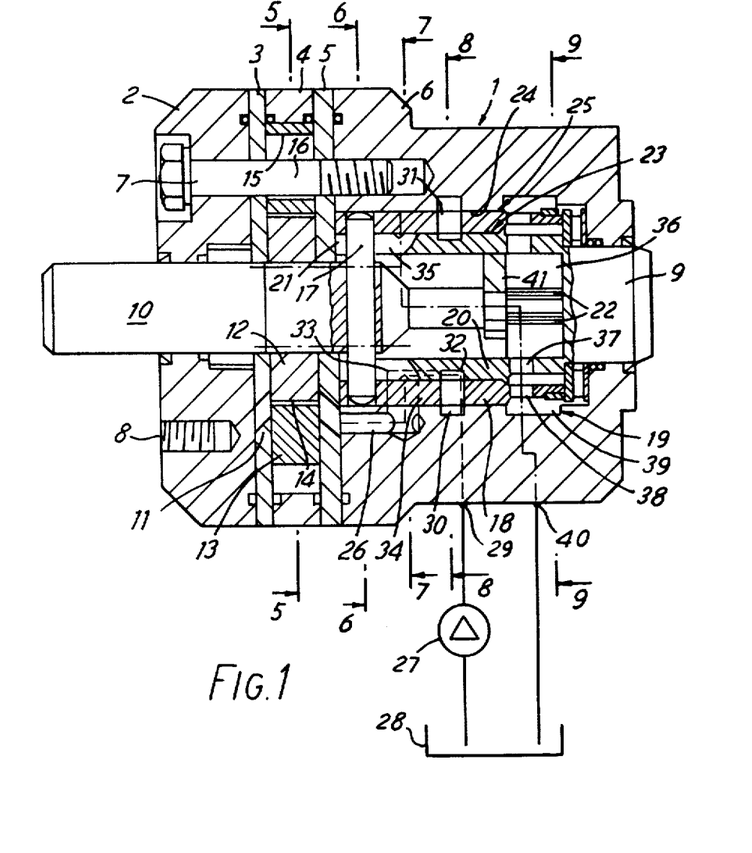
FIG. 1 is a longitudinal section through a torque amplifier according to the invention.

An entrainment pin 17 tightly pressed into the output shaft 10 has its outer ends tightly inserted in an outer sleeve 18 of a rotary slide arrangement 19. An inner sleeve 20 is made in one piece with the input shaft 9. The inner sleeve comprises recesses 21 which surround the entrainment pin 17 with rotary play to provide a lost motion construction which limits relative movement between sleeves 18 and 20. Neutral position springs 22 are in the form of leaf springs of which the ends pass through the two sleeves and bias them to the neutral rest position.

Between the inner sleeve 20 and the outer sleeve 18 there is formed a control valve 23 which opens when the inner sleeve is turned, for example with the aid of a manual steering wheel engaging the input shaft 9, whereupon the motor 11 starts to run, and which closes when the outer sleeve has been turned through the same angle together with the output shaft. A distributor valve 25 formed between the outer sleeve 18 and the housing bore 24 ensures that each compression chamber 14 is connected to the pressure or suction side by way of an associated housing passage 26.

The construction of this slide valve arrangement can also be as shown in FIGS. 2 to 4 and 10 to 12.

Referring again to FIGS. 1 and 5 to 9, a pump 27 conveys pressure fluid from a tank 28 by way of a connection 29 to a distributor groove 30 (FIGS. 1 and 8) from which the pressure fluid flows through bores 31 (FIGS. 1 and 8) to an inner annular groove 32 (FIGS. 1 and 8) and then reaches the housing passage 26 (FIGS. 1, 6 and 7) by way of axial grooves 33 (FIGS. 1, 7 and 8) and, when the control valve 23 is open, by way of control orifices 34 (FIGS. 1 and 7) in the outer sleeve 18 (FIGS. 1, 6, 7 and 8) as is shown in broken lines in FIG. 1. From the compression chambers 14 (FIGS. 1 and 5) which are at outlet pressure, the pressure fluid flows by way of the associated housing passages 26, control orifices 34 in the outer sleeve to recesses 35 (FIGS. 1 and 7) in the inner sleeve which alternate with the axial grooves 33. It then reaches an annular chamber 39 (FIGS. 1 and 9) by way of the inner chamber 36 (FIGS. 1 and 9) of the inner sleeve and by way of apertures 37 and 38 in the two sleeves, the chamber 39 (FIGS. 1 and 9) being connected to a tank connection 40. This flow is shown in chain-dotted lines in FIG. 1.

A three-armed bearing member 41 supported on the inside of the inner sleeve 20 is disposed at the inner end of the output shaft 10.

It will be evident that the output shaft 10 and the outer sleeve 18 are interconnected practically without play and that the torque of the gear 12 (FIGS. 1 and 5) can also be derived directly from the output shaft 10. During emergency control operation, the inner sleeve 20 engages the entrainment pin 17 (FIGS. 1 and 6) which transmits the torque directly to the output shaft 10. The total diameter of the housing and sleeve is small. The axial length is short.

In the embodiment of FIGS. 2 to 4 and 10 to 12, corresponding parts are designated by reference numerals which are increased by 100 in relation to the embodiment of FIG. 1. A significant difference is that the tightening screws 107 holding the parts 102 to 106 of the housing 101 together are disposed beyond the gear ring 113. The circular recesses 115 of the gear ring are penetrated by pins 142 which are mounted in the end wall 102 and in the valve block 106.

Figure 2:
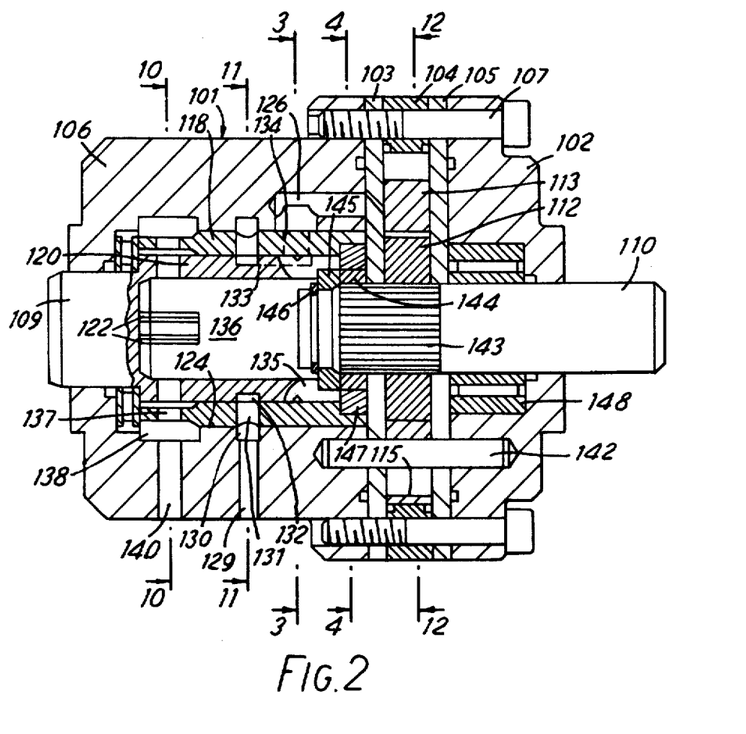
FIG. 2 is a longitudinal section through a modified embodiment.

Another difference is that a ring element 144 seated on the teeth 143 of the output shaft 110 is held in place by means of a retaining ring 145 and spring ring 146. Two pin-like keys 147 engage in depressions of the ring element 144 and the outer sleeve 118 to form a rotary coupling. The outer periphery of the ring element 144 corresponds to the inner periphery of the outer sleeve 118 so that the ring element 144 at the same time serves as a bearing member which supports transverse forces at the housing bore 124 by way of the outer sleeve. A normal roller bearing 148 is disposed at the opposite side of the gear 112.

The leaf springs 122 are comparatively stiff so that, during emergency control operation, direct torque transmission can take place by way of them.

Figure 3:
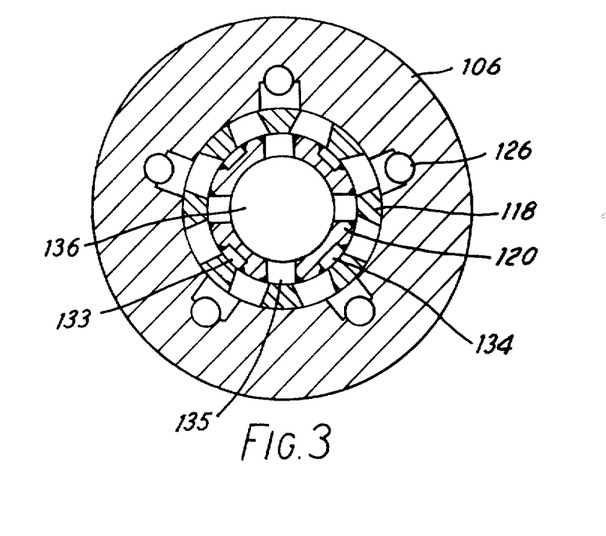
FIG. 3 is a sectional view taken on the line 3—3 in FIG. 2.
Figure 4:
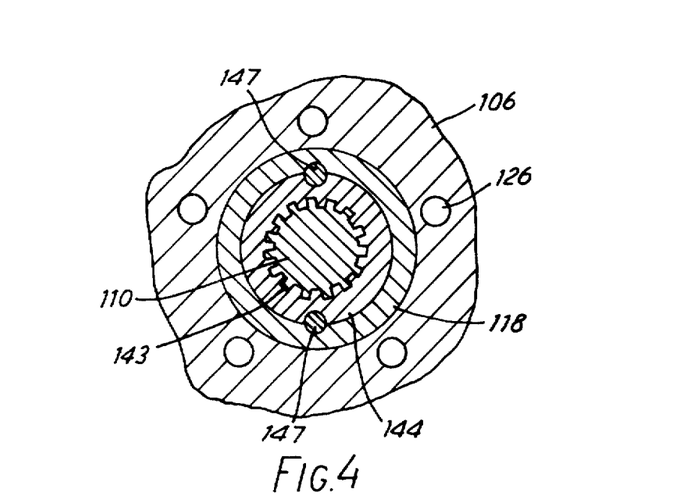
FIG. 4 is a sectional view taken on the line 4—4 in FIG. 2.
Figure 5:
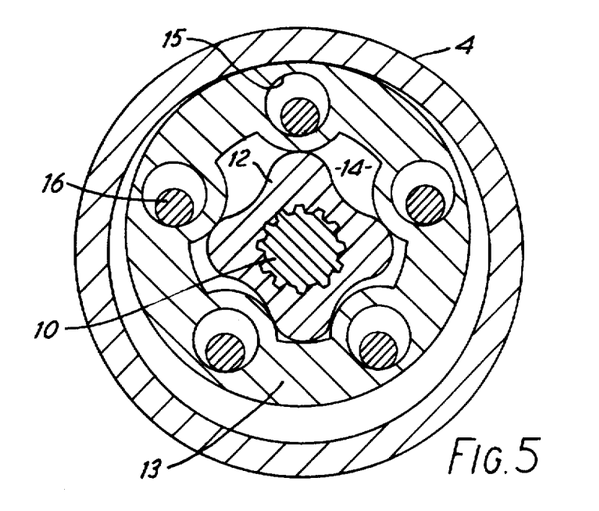
FIG. 5 is a sectional view taken on line 5—5 of FIG. 1.
Figure 6:
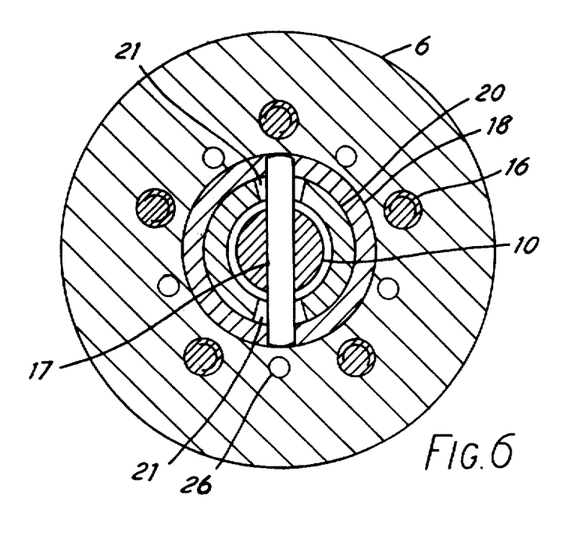
FIG. 6 is a sectional view taken on line 6—6 of FIG. 1.
Figure 7:
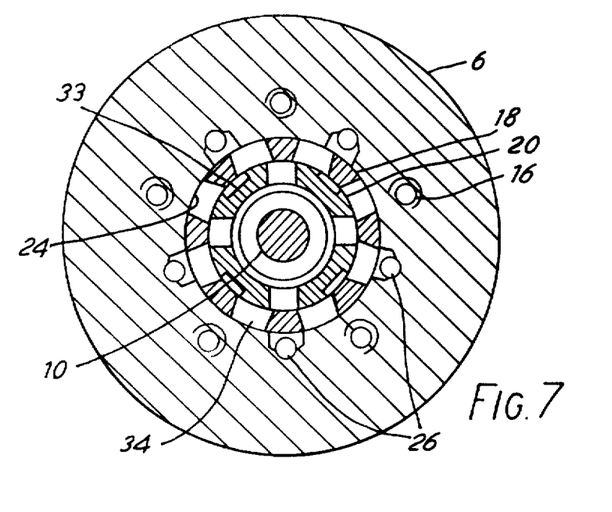
FIG. 7 is a sectional view taken on line 7—7 of FIG. 1.
Figure 8:
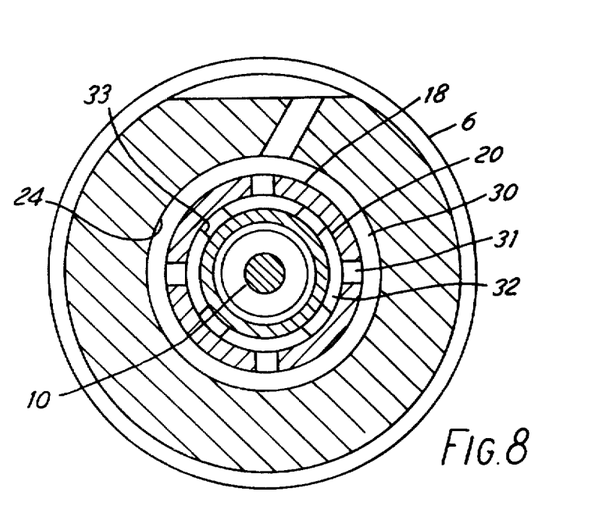
FIG. 8 is a sectional view taken on line 8—8 of FIG. 1.
Figure 9:
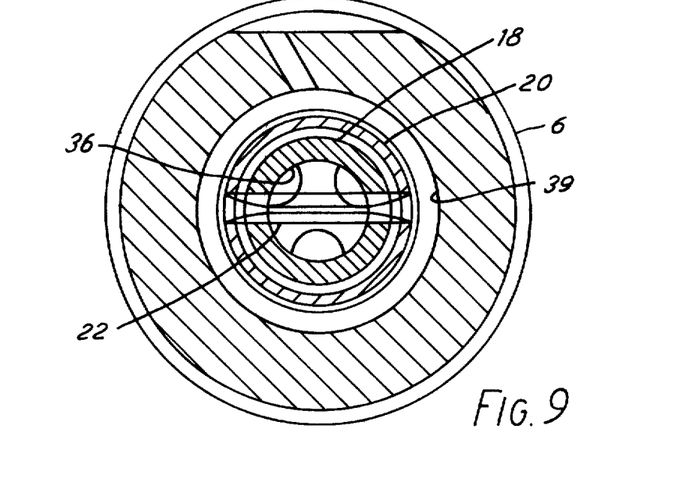
FIG. 9 is a sectional view taken on line 9—9 of FIG. 1.
Figure 10:
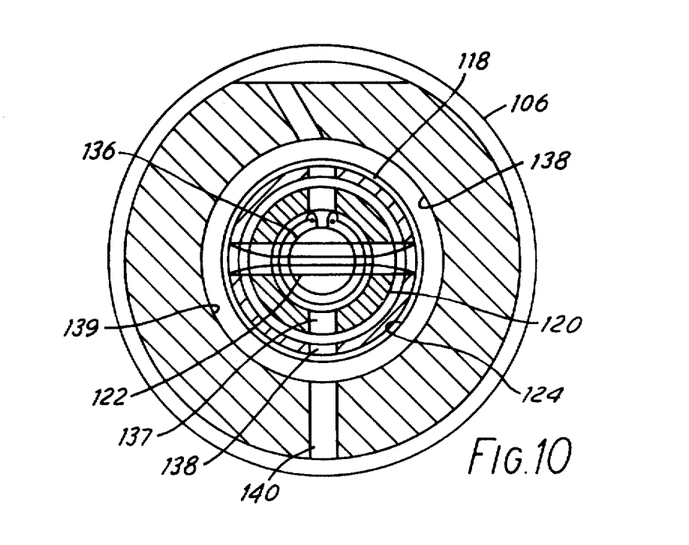
FIG. 10 is a sectional view taken on line 10—10 of FIG. 2.
Figure 11:
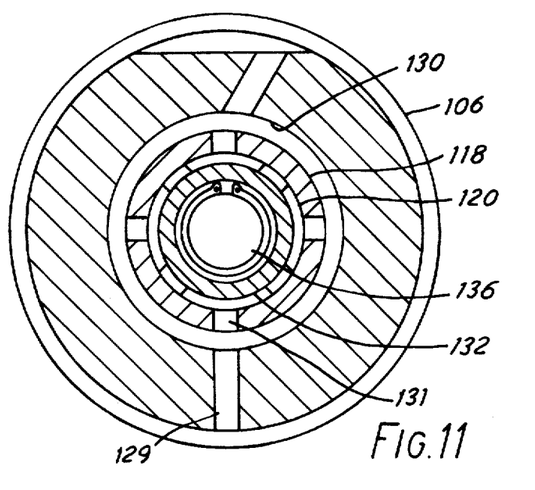
FIG. 11 is a sectional view taken on line 11—11 of FIG. 2.
Figure 12:
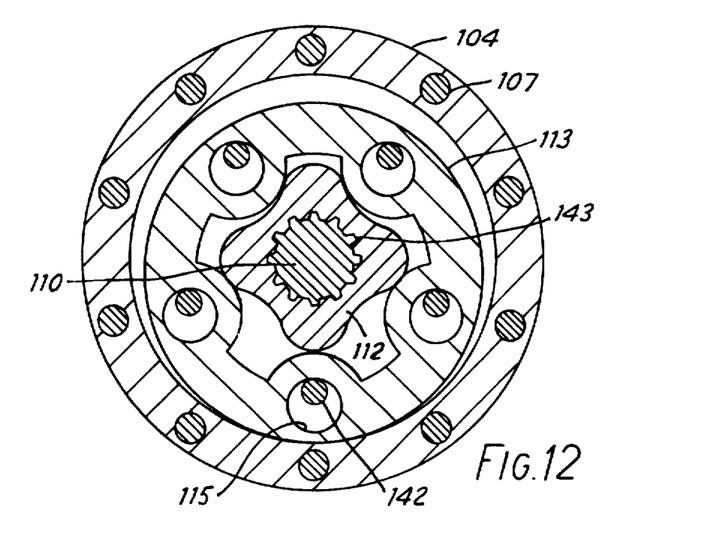
FIG. 12 is a sectional view taken on line 12—12 of FIG. 2.

FIG. 3 also shows that the width of the control orifices 134 is somewhat larger in the peripheral direction than the spacing between the axial grooves 133 and the recesses 135, so that in the neutral position there is a short-circuit between the pump and tank whereby a correspondingly low load is applied to the pump.

What is claimed:

1. A hydraulic torque amplifier for steering device or the like, comprising, housing means having interchangeable inlet and outlet ports, input and output shafts rotatably journaled in said housing in a coaxial and axially spaced relation, a planetary piston motor having an externally toothed gear connected to said output shaft and meshing internally toothed gear secured to said housing with movement relative to said housing being limited to orbital and nonrotational motions, the teeth of said gears meshing in sealing engagement to form expanding and contracting cells on opposite sides of the line of eccentricity between said gears, a bore in said housing, said housing having a set of passages with respective communication with said cells and forming a set of circumferentially arranged openings in said bore, and a rotary slide valve arrangement in said bore using said set of bore openings for directing pressurized fluid from said inlet port to said planetary piston motor and exhausting fluid from said motor to said outlet port, said slide valve arrangement having inner and outer sleeves connected respectively to said input and output shafts, said outer sleeve having two sets of alternately arranged commutating passages cooperable with said set of housing bore openings, said inner sleeve having communication with said inlet and outlet ports and being moveable in opposite directions relative to said outer sleeve to selectively connect said inlet and outlet ports to said commutating passages to effect a desired direction of rotation for said output shaft, neutral position spring means between said sleeves for closing said valve arrangement in the absence of torque being applied to said input shaft, and lost motion means between said input and output shaft for limiting relative rotational movement therebetween.

2. The hydraulic torque amplifier of claim 1 wherein said output shaft supports said externally toothed gear on both sides thereof.

3. The hydraulic torque amplifier of claim 1 wherein said internally toothed gear has circumferentially arranged holes, bolt means for holding together parts of said housing means extending through said holes to provide said orbital and nonrotational motions.

* * * * *